United States Patent [19]

Rice

[11] 4,301,787
[45] * Nov. 24, 1981

[54] SOLAR HEAT COLLECTOR

[75] Inventor: Frederick H. Rice, Van Nuys, Calif.

[73] Assignee: Fred Rice Productions, Inc., Van Nuys, Calif.

[*] Notice: The portion of the term of this patent subsequent to Apr. 24, 1996, has been disclaimed.

[21] Appl. No.: 608,962

[22] Filed: Aug. 29, 1975

[51] Int. Cl.³ .............................................. F24J 3/02
[52] U.S. Cl. ................................. 126/429; 126/901; 52/202
[58] Field of Search ............... 126/270, 271, 432, 429, 126/419, 901; 236/1 A; 49/63; 52/202

[56] References Cited

U.S. PATENT DOCUMENTS

| | | | |
|---|---|---|---|
| 2,595,905 | 5/1952 | Telkes | 126/270 |
| 2,918,709 | 12/1959 | Corcoran | 126/270 |
| 3,048,375 | 8/1962 | Walker | 126/270 |
| 3,205,937 | 9/1965 | Shyffer | 126/270 |
| 3,288,206 | 11/1966 | Beeler | 236/1 A |
| 3,563,305 | 2/1971 | Hay | 126/429 |
| 3,847,136 | 11/1974 | Salvail | 126/271 |
| 3,860,055 | 1/1975 | Wild | 126/271 |
| 3,952,947 | 4/1976 | Saunders | 237/1 A |
| 3,957,029 | 5/1976 | Nozik | 126/443 |
| 3,974,822 | 8/1976 | Patil | 126/450 |
| 3,981,293 | 9/1976 | Gillery | 126/901 |
| 3,990,635 | 11/1976 | Restle et al. | 237/1 A |
| 4,050,443 | 9/1977 | Peck et al. | 126/432 |

Primary Examiner—William E. Wayner
Attorney, Agent, or Firm—Lyon & Lyon

[57] ABSTRACT

Disclosed herein is a solar heat collector which is placed across an open window area for selectively heating the interior of a dwelling place or the like. The collector includes a plurality of fins transversely disposed across the window area between two panes of translucent material which form an insulating chamber. One end of the chamber communicates with a warm air outlet, the other end with a cool air inlet and the innermost pane is coated with a highly reflective material. Each fin is provided with an energy absorbant coating on one side thereof and has a reflective coating surface on the other so that upon normally aligning the absorbant side of the fins with respect to the sun's rays, the air within the chamber is heated and directed to the warm air outlet causing cold air to be drawn into the chamber through the cool air inlet. Reversal of the orientation of the fins causes incoming rays to be reflected.

12 Claims, 11 Drawing Figures

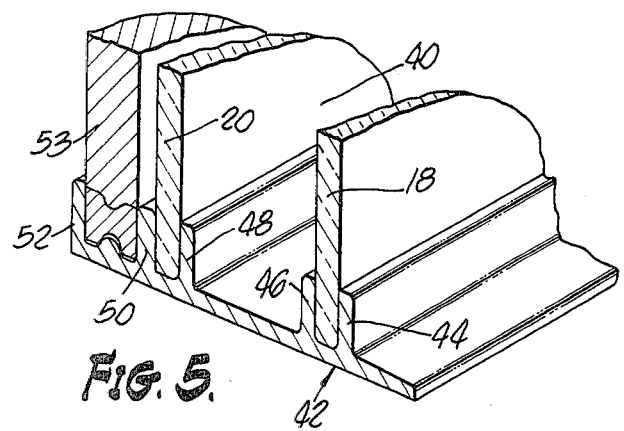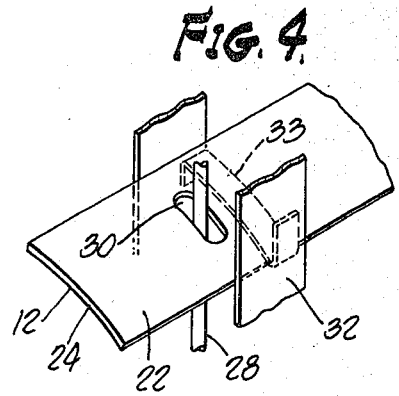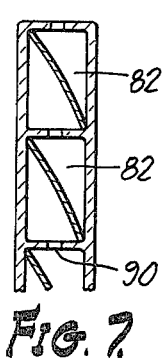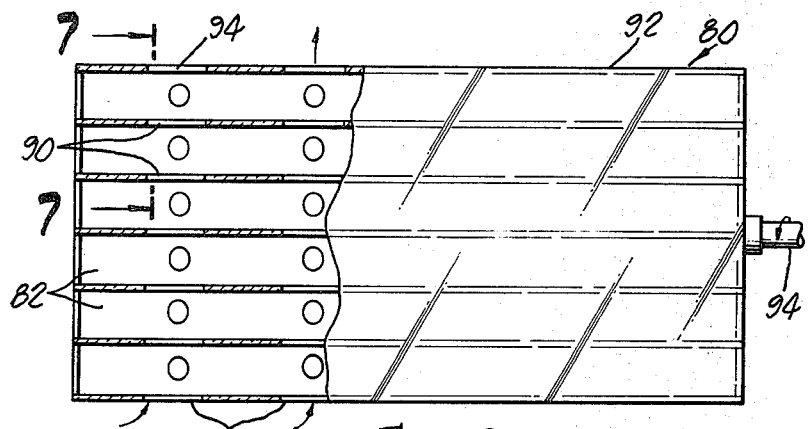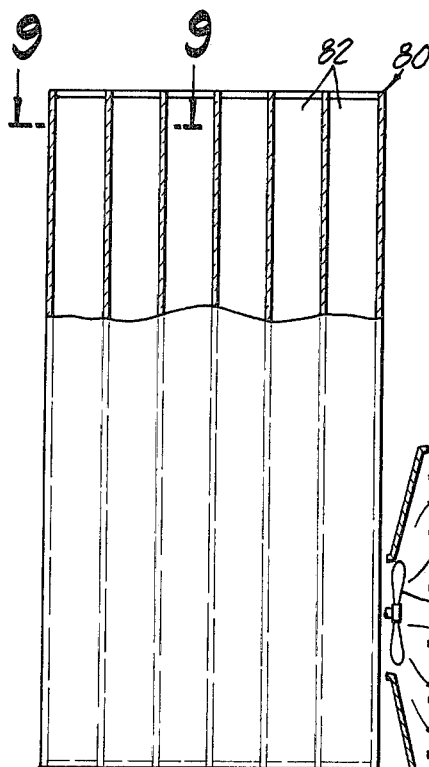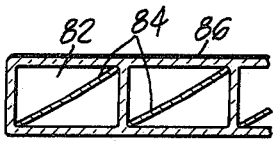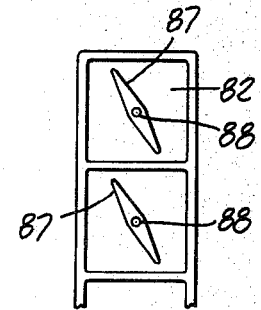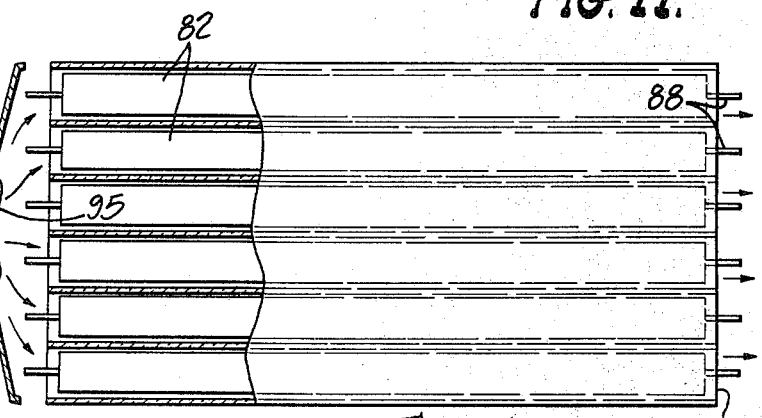

SOLAR HEAT COLLECTOR

BACKGROUND OF THE INVENTION

In recent years considerable attention has been focused on energy conservation. One of the channels of such attention has been in the area of solar energy and several devices have been constructed in an effort to heat homes through the use of solar energy. Typically, such devices include large solar collectors comprised of one or more fluid conduits which undergo sinuous paths over an energy absorbing surface. Such devices are often impractical due to the necessary size of the collector and the supporting mechanism which faces the collector toward the sun and the expense involved in constructing such a system. Other systems incorporate a parabolic tracking dish to act as a collector, a high intensity storage device and a heat exchanger. Such systems are also quite bulky and costly. More sophisticated systems incorporate the use of solar cells, however, such devices are at the present time too expensive to meet with popular acceptance. It would be highly desirable to provide a solar heat collector which was both relatively compact and inexpensive yet efficient and decorative. The device hereinafter to be described fulfills the requirements while additionally providing a heat insulated viewing window for the home.

SUMMARY OF THE INVENTION

Briefly, the invention comprises a solar heating apparatus which is particularly adapted for heating the interior of a building or home while providing a heat insulated window therefore. The apparatus is comprised of a plurality of fins disposed between two panes of translucent or transparent material across an open window area. One side of each of the fins is energy absorbent while the other is reflective to selectively generate heat within the defined chamber which is then conveyed into the room or to reflect undesired heat. The inner transparent panel is provided with a reflective surface to prevent any undesired heating of the room through a greenhouse effect. Means are provided for reversing the orientation between the heat absorbing and heat reflective disposition and, when desired, for varying the angular orientation of the fins to follow the movement of the sun and thereby obtain a maximum heating efficiency.

It is the principal object of the present invention to provide a compact solar heating apparatus for selectively heating the interior of a dwelling place or the like.

It is another object of the present invention to provide solar heating apparatus for a dwelling place or the like which combines the solar heater with a heat insulated window.

It is a further object of the present invention to provide a solar heating apparatus which is disposed of across the window area and in certain embodiments can be readily withdrawn from sight to provide an unobstructed view through the window area.

It is a still further object of the present invention to provide a solar heating apparatus for a dwelling place or the like which is both decorative and highly efficient.

It is another object of the present invention to provide a solar heating apparatus for a dwelling place or the like which is a simple construction and economical to manufacture.

It is still a further object of the present invention to provide a solar heating apparatus for a dwelling place or the like which eliminates undesirable heating caused by a greenhouse effect.

It is yet another object of the present invention to provide a solar heating apparatus for dwelling places or the like which is adjustable to reflect the sun's rays.

These and other objects and advantages of the present invention will become apparent from the following detailed description taken in conjunction with the accompanying drawings.

IN THE DRAWINGS

FIG. 4 is an enlarged partial view of a fin, adjusting tape and gathering cord.

FIG. 5 is an enlarged partial sectional view of the panel supporting member, transparent panels and insulating panel.

FIG. 6 is a front view of a second embodiment of the solar heating apparatus.

FIG. 7 is a sectional view taken along line 7—7 in FIG. 6.

FIG. 8 is a front view of a second embodiment of the invention mounted in a vertical disposition.

FIG. 9 is a sectional view taken along line 9—9 of FIG. 8.

FIG. 10 is a front view of the second embodiment of the invention and including an air moving means.

FIG. 11 is a partial end view of the second embodiment of the invention incorporating rotating fins.

DESCRIPTION OF THE PREFERRED EMBODIMENTS

Figure 1:
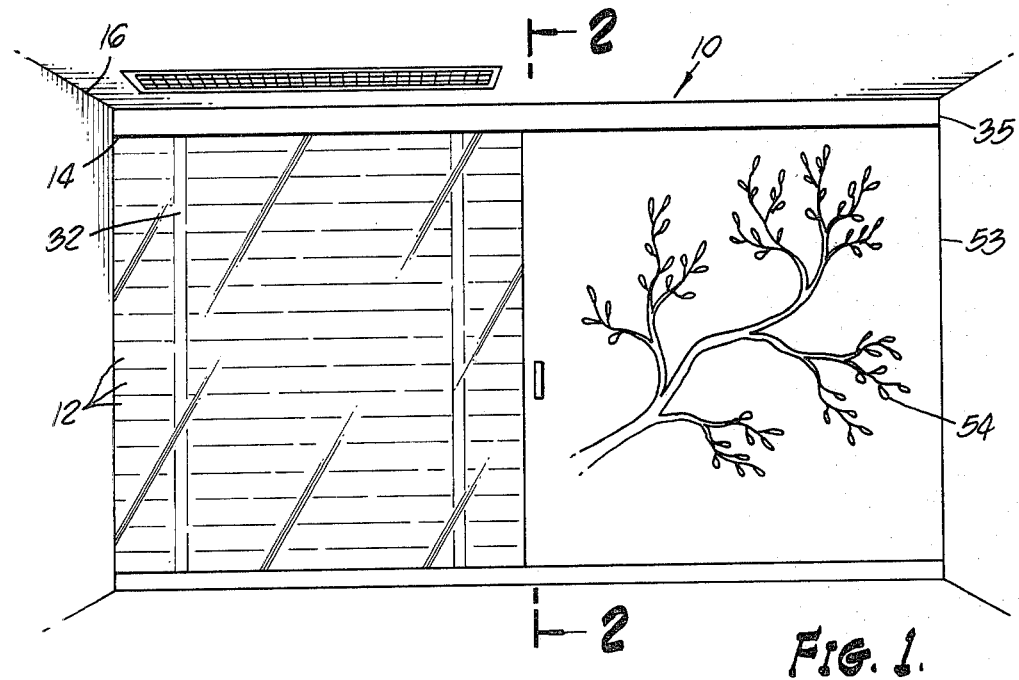
FIG. 1 is a front view of the solar heating apparatus mounted across a window opening in a home with the insulating panel moved to the side thereof.

Referring now in detail to the drawings, the solar heating apparatus 10 is comprised of a plurality of adjustable metal or plastic fins 12 which are transversely disposed across a window area 14 of a home 16 or the like between two panes 18 and 20 of translucent or preferably transparent material such as glass or plastic. Each fin has an energy absorbent side 22 which is covered with a dark highly absorbent material, preferably one which is additionally low in energy emission. Several matte black velvet paints are suitable for such purposes as well as various plating process which have the additional benefit of reduced energy emission. The other side 24 of each fin 12 is highly reflective and each of the fins is carried between panes 18 and 20 by an adjusting and gathering assembly 26 similar to that used on Venetian blinds. The assembly includes a gathering cord 28 which extends through oval apertures 30 in each of the fins 12, standard manual adjusting cords (not shown), straps 32, transverse ladder straps 33 which extend under and support the fins 12, and a standard gear assembly 34 which is disposed within an eave 35 and which can be hand operated by the adjusting cords or driven by a motor drive 37, see FIG. 2. By means of this assembly, the fins 12 can be disposed in any desired angular orientation across the window area with either side thereof facing the sun to absorb or reflect the sun's rays or, alternatively, raised under the eave 35 to provide an unobstructed view through the transparent panes 18 and 20 across the window area. Additionally, the motor drive can be operated continually and geared so as to continually align the fins 12 normal to the sun's rays as the sun passes thereby and thereby obtain a maximum heating efficiency from the apparatus 10.

The transparent panes 18 and 20 which are disposed about fins 12 to define an insulating chamber 40 are carried at their lower ends by an extrusion 42 which is disposed along the lower ends of the window area 14. The extrusion preferably has five upstanding flanges 44, 46, 48, 50 and 52. Flanges 44 and 46 support pane 18; flanges 48 and 50 support pane 20; and flanges 50 and 52 support a panel 52 which is slidably mounted therebetween and constructed of an insulating material such as polyurethane and provided with a decorative finish 54 as seen in FIG. 1. The inner side of the inner transparent pane 20 is provided with a thin layer 55 of transparent heat reflective material to maintain the transparency of the apparatus while substantially reducing any heat loss through the window through greenhouse effect. Tin oxide and indium oxide have been found to be well suited for such use as they are almost completely transparent to visible light yet have high reflective capabilities in the infra-red region.

Figure 2:
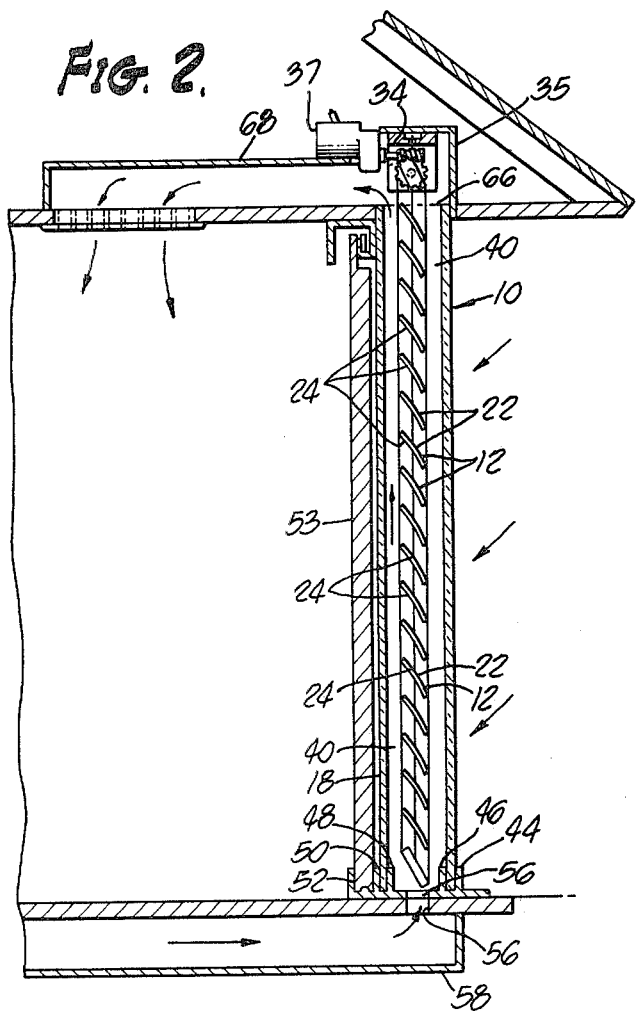
FIG. 2 is a sectional side view of the solar heating apparatus taken along line 2—2 in FIG. 1.
Figure 3:
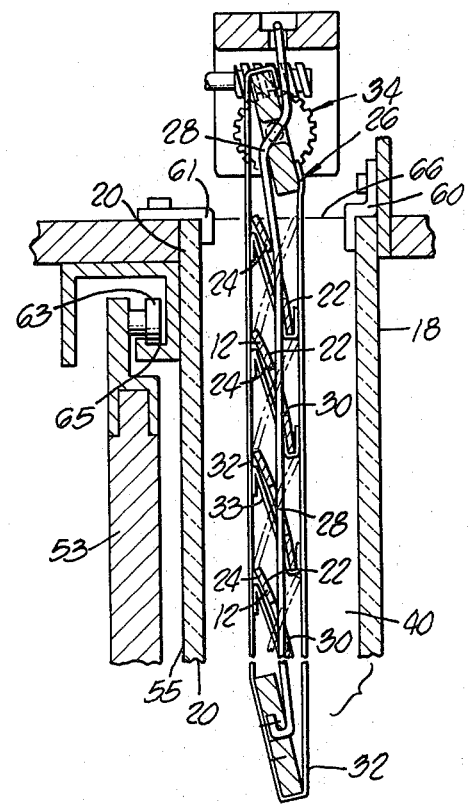
FIG. 3 is a side view of the solar heating apparatus illustrating a fin adjusting and gathering mechanism.

The lower extrusion 42 has elongated aperture 56 extending between the upstanding flanges 44 and 46 to define a cool air inlet for the insulating chamber 40. The cool air inlet communicates with the interior of the home by means of conduit 58. An air filter (not shown) can be disposed within the conduit to filter the air passing therethrough. The upper ends of the transparent panels 18 and 20 can be carried by an extrusion similar to that supporting the lower ends thereof, or, as shown in FIGS. 2 and 3, by fastening members 60 and 61 while the insulating panel 53 is carried by a roller 63 which rides in an elongated track 65.

In use the heat collecting fins 12 are angularly disposed such that their heat absorbant sides 22 are normal to the rays of the sun. This angular orientation can be varied or maintained by hand or by means of the motor-drive 37, which, if desired, can automatically rotate the fins to continually vary their orientation throughout the day as discussed above. When the sun's rays impinge upon the heat collecting fins 12, considerable heat is generated within the insulating chamber 40 defined by the transparent panes of glass 18 and 20. The heat then flows by convection or can be forced by means of a fan (not shown) from the fins, through an air outlet 66 in the upper end of the chamber into a conduit 68 which directs the heated air into the room. This movement of air causes cold air from the room to pass through conduit 58 and into the insulating chamber 40 replacing the heated air which has passed therefrom. In this manner, cool air is continually replaced with hot air through the use of solar energy.

The heat reflective coating of tin or indium oxide on the inner glass pane 20 prevents the heat generated within the insulating chamber 40 from escaping therefrom and heating the room through an undesirable greenhouse effect. To additionally insulate the solar heating apparatus from the room, the decorative insulation panel 53 which is shown in FIG. 1 positioned to the side of the window area 14, can be disposed in front of the insulating chamber 40. This is easily accomplished by sliding the panel with roller 63 running within track 63 and the lower end of the panel sliding between flanges 50 and 52 of the extruded support member 42. In this position the decorative panel further insulates the inside environment from the outside temperatures, whether it be day or night and can serve as an additional security device in that it can be locked in place and thereby prevent entry through the breakage of the transparent glass panes.

If usage of the apparatus as heretofore described is found to provide an excessive amount of heat, the angular orientation of the absorbent side of the fins can be varied to deviate from a normal plane and thereby absorb less heat. As noted above, if it is desirable to keep the interior of the home cool, the disposition of the collector fins can be reversed to present the reflective sides thereof to the incoming rays of the sun. In this manner, a high percentage of the solar energy is reflected and the house is maintained in a cool environment.

A second embodiment of the present invention is illustrated in FIGS. 7–11, wherein the insulating chamber 80 is constructed of a translucent or transparent or glass material which is comprised of a plurality of isolated elongated channels 82, each channel having a heat collecting fin 84 disposed therein. Such a chamber defines a continuous I-beam structure to afford a maximum amount of strength to prevent warping or bending while providing both a thermal and sound insulating chamber. As in the prior embodiment the fins are preverably constructed of metal such as aluminum, although plastic construction could be used, and they are suitably coated with an energy absorbant material on one side thereof as described with respect to fins 12. Also highly reflective coating 86 is provided on the outside of the inner wall of chamber 80 (see FIG. 9) to prevent undesirable heating through a greenhouse effect. Coating 85 is similar to coating 55 in the prior embodiment of the invention except that it must be disposed on the outside of the chamber wall due to the construction thereof. Aluminizing by a vacuum defrosting process or laminating a thin adhesive shut of metalized material could be employed to provide the desired coating on the exterior of the chamber wall.

The insulating chamber 80 can be oriented such that channels 82 extend either in the horizontal or vertical direction and the fins can be rigidly mounted in the chamber, as shown in FIGS. 7 and 9, or be of a reduced size 87 and rotatably mounted about a central wire 88 as seen in FIGS. 10 and 11. In the latter case, means (not shown) can be provided for collectively rotating the carrier wires 88 to collectively rotate the fins similar to the prior embodiment. When utilizing an insulating chamber 80 having fins rigidly mounted therein, the fins are preferably disposed along the diagonals of the channels 82 to increase their size and hence the efficiency of the apparatus. If the channels and fins are horizontally disposed as seen in FIG. 6 the fins are angled upwardly and rearwardly within the channel to present a maximum amount of service area of the incoming rays of the sun. In such an insulation, a plurality of apertures 90 should extend between the individual channels 82 and through the fins 84 to allow the heated air to flow between the channels from the lower or inlet end 92 of the insulating chamber 80 to the upper outlet end 94 thereof. Alternatively, a fan 95 (see FIG. 10) or other suitable airflow means could be disposed along one side of the insulating chamber 80 to direct air from that side (inlet end) to the other end of the channels (outlet end) to a suitable conduit which would then carry the air into the room to be heated. To reduce the heating effect if desired, fins need not be disposed in each chamber, but could be in varying combinations, for example, every other channel.

The insulating chamber 80 of the present embodiment can also be mounted such that the individual channels and collecting fins are disposed in a vertical disposition as shown in FIG. 8 and thereby obviate the need for any air driving means or additional apertures 90 to provide air passage between the individual channels. In such an insulation, the collecting fins 82 can again either be rigidly or rotatably mounted. If the fins are rigidly mounted, they would extend along the diagonal of the channels and face a direction from which the sun would normally shine in the non-summer seasons. Such an installation would be highly efficient during those times of the year when heating would be most necessary as the sun does not pass directly overhead as is the case during the summertime.

When utilizing rigidly mounted fins in this second embodiment of the invention, it would be preferable to provide reflective coatings on the other sides of the fins, as in the prior embodiment and then include a means for reversing the entire insulating chamber 80 to present the reflective side of the fins to the incoming rays of the sun and thereby utilize the full potential of the apparatus. This is most easily accomplished by breaking the chamber into individual adjacent section 92, each of which are rotatable by a conventional means 94 (see FIG. 6) to reverse the sides thereof facing the sun's rays and thereby reflect the same. If desired such rotating means could also rotate the sections to a lesser extent and merely varying the angle at which the sun's rays impinge on the fins as is done in the first embodiment of the invention. If the fins are mounted about a center wire, as shown in FIGS. 10 and 11, only the individual fins need be rotated to reflect undesired incoming heat.

While the first embodiment of the present invention is primarily suited for window areas, the second embodiment is ideally suited for locations where the occupant need not see therethrough, such as a skylite or the like. However, as noted above, the insulating chamber 80 could be constructed of a transparent plastic which would allow a person to see therethrough if desired.

Various changes and modifications may be made in carrying out the present invention without departing from the spirit and scope thereof. In so far as these changes and modifications are within the purview of the appended claims they are to be considered part of the invention.

I claim:

1. A solar heat collector adapted to be disposed across an open window area in an enclosure, said collector comprising a transparent walled heat insulating chamber having an air inlet and air outlet therein for communicating said chamber with the interior of said enclosure; a layer of heat reflecting material disposed on a wall of said chamber to reduce heat loss therethrough; a plurality of fins transversely disposed within said chamber, each of said fins defining a heat reflective surface on one side thereof and having an energy absorbing material on the other side thereof and means for collectively varying the angular orientation of said fins within said enclosure such that either the reflective or absorbent sides of said fins can be collectively directed toward the sun at a selected and variable angle thereby regulating the warm air flow from said chamber to said enclosure through said air outlet.

2. The combination of claim 1 wherein said reflective material is tin oxide.

3. The combination of claim 1 wherein said reflective material is indium oxide.

4. A solar heat collector adapted to be disposed across an open window area in an enclosure, said collector comprising a pair of transparent panes; means for holding said panes in a spaced relation and defining an insulating chamber disposed between said panes, said chamber having an air inlet and an air outlet for communicating said chamber with the interior of the enclosure; a layer of heat reflecting material disposed on one of said transparent panes to reduce heat loss therethrough; a plurality of fins transversely disposed within said chamber, each of said fins defining a heat reflective surface on one side thereof and having an energy absorbing material on the other side thereof; and means for collectively varying the angular orientation of said fins within said chamber such that either the reflective or absorbent sides of said fins can be collectively directed toward the sun at a selected and variable angle thereby regulating the warm air flow from said chamber to said enclosure through said air outlet.

5. The combination of claim 4 wherein said heat reflective layer is comprised of tin oxide.

6. The combination of claim 4 wherein said heat reflective layer is comprised of indium oxide.

7. The combination of claim 4 including a panel of heat insulating material slidably mounted on said holding means and spaced from said transparent panel having said layer of heat reflective material thereon.

8. A solar heat collector adapted to be disposed across an open window are in an enclosure, said collector comprising an internal transparent pane; an external transparent pane; means for holding said panes in a spaced relation across said window area to define an insulating chamber disposed between said panes, said chamber having an air inlet and an air outlet communicating said chamber with said enclosure; a plurality of fins transversely disposed between said panes within said chamber, each of said fins having an energy reflecting side and an energy absorbing side; a layer of heat reflective material disposed on the interior side of said internal transparent pane to reduce heat loss through said pane from said chamber to said enclosure; and means for collectively varying the angular orientation of said fins within said chamber such that either the reflective or absorbent sides of said fins can be collectively directed toward the sun at a selected and variable angle thereby regulating the warm air flow from said chamber to said enclosure through said air outlet.

9. The combination of claim 8 including means for gathering said fins within said chamber to present an unobstructed view through said chamber.

10. The combination of claim 8 wherein said heat reflective layer is comprised of tin oxide.

11. The combination of claim 8 wherein said heat reflective layer is comprised of indium oxide.

12. The combination of claim 8 including means for continually and collectively aligning the absorbant side of said fins in a substantially perpendicular disposition with respect to the rays of the sun.

* * * * *